(12) United States Patent
Androvandi et al.

(10) Patent No.: US 12,129,758 B2
(45) Date of Patent: Oct. 29, 2024

(54) METHOD AND SYSTEM FOR DETERMINING A LITHOLOGY OF A SUBTERRANEAN FORMATION

(71) Applicant: Schlumberger Technology Corporation, Sugar Land, TX (US)

(72) Inventors: Sophie Androvandi, Clamart (FR); Maurice Ringer, London (GB); Karim Bondabou, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/305,877

(22) Filed: Apr. 24, 2023

(65) Prior Publication Data

US 2023/0258079 A1    Aug. 17, 2023

Related U.S. Application Data

(63) Continuation of application No. 17/037,878, filed on Sep. 30, 2020, now Pat. No. 11,661,843.

(30) Foreign Application Priority Data

Oct. 11, 2019  (EP) ..................................... 19306331

(51) Int. Cl.
*E21B 49/00* (2006.01)
*G01V 1/50* (2006.01)

(52) U.S. Cl.
CPC .......... *E21B 49/005* (2013.01); *E21B 49/003* (2013.01); *G01V 1/50* (2013.01)

(58) Field of Classification Search
CPC ...... E21B 49/00; E21B 49/003; E21B 49/005; G01V 1/50
See application file for complete search history.

(56) References Cited

U.S. PATENT DOCUMENTS 5,894,096 A * 4/1999 Kotraba ................... G01N 1/04
15/257.6
9,581,723 B2   2/2017 Hurley et al.
(Continued)

FOREIGN PATENT DOCUMENTS

WO    2010043951 A2    4/2010
WO    2015070022 A1    5/2015

OTHER PUBLICATIONS

Search and Examination Report R. 62 EPC issued in European Patent Application No. 20200818.1 dated Mar. 12, 2021, 4 pages.

*Primary Examiner* — Kristyn A Hall
(74) *Attorney, Agent, or Firm* — Jeffrey D. Frantz (57) ABSTRACT

A first method is provided for determining a lithology of a subterranean formation into which a wellbore has been drilled. The method includes receiving a set of measurement logs including one or more measurement logs, each representing a measured characteristic of the wellbore plotted according to depth. The method also includes segmenting the wellbore into regions based on identified change of trend in one or more of the measurement logs of the set, and sub-segmenting at least one region into zones based on detection of appearance or disappearance of a rock type in the cuttings percentage log, The method also includes determining, in each zone, a location, length and rock type of one or more layers based on a total percentage of each rock type in the zone in the cuttings percentage log and at least one of the additional measurement logs.

12 Claims, 6 Drawing Sheets

(56) References Cited

U.S. PATENT DOCUMENTS

| | | | |
|---|---|---|---|
| 2005/0060096 A1* | 3/2005 | Hutchinson | E21B 44/00 |
| | | | 702/6 |
| 2009/0055097 A1 | 2/2009 | Kowalik et al. | |
| 2012/0217067 A1* | 8/2012 | Mebane, III | E21B 44/02 |
| | | | 175/57 |
| 2013/0146304 A1* | 6/2013 | Sonnier | E21B 19/16 |
| | | | 166/380 |
| 2017/0260855 A1 | 9/2017 | Yang et al. | |
| 2021/0108511 A1 | 4/2021 | Androvandi et al. | |

\* cited by examiner

METHOD AND SYSTEM FOR DETERMINING A LITHOLOGY OF A SUBTERRANEAN FORMATION

This application is a continuation of U.S. patent application Ser. No. 17/037,878, filed on Sep. 30, 2020, which claims priority to and the benefit of EP Application No 19306331.0, filed on Oct. 11, 2019. Each of the above disclosures is hereby incorporated herein by reference in its entirety.

BACKGROUND

The disclosure relates to a method and system for determining a lithology of a subterranean formation.

When drilling a wellbore, it is critical to know as soon as possible as much information regarding the wellbore and the surrounding formation in order to make educated decisions during the drilling of the wellbore and to evaluate the potential of the formation.

In this context, mud logging services are generally used at the well site in order to gather information on the wellbore and formation. Mud logging services comprise in particular sensing of drilling parameters at the surface (such as weight on bit, torque on bit, etc.) as well as measurements of the material coming out of the well, in particular analysis of the cuttings and drilling fluid coming out of the wellbore.

Such services may be complemented by downhole measurements obtained directly by the tool in the formation and transmitted at the surface via telemetry.

All these measurements enable to perform set up an interpreted lithology representing the lengths; locations and rock type of the layers in the formation, i.e., the sequence of the layers drilled. Currently, the interpreted lithology is created by combining multiple measurements made by the mud logger while drilling, in particular, the percentage of rock type (lithology) measured in the drilled cuttings that come to surface, and the data from downhole LWD tools that is transmitted to surface, such as gamma-ray count measurement. The creation of the interpreted Lithology is today a manual process that is inconsistent between different mud loggers and is long and tedious.

SUMMARY

The disclosure relates to a first method for determining a lithology of a subterranean formation into which a wellbore has been drilled. The method comprises receiving a set of measurement logs comprising one or more measurement logs, each representing a measured characteristic of the wellbore plotted according to depth. The measured characteristic includes at least cuttings percentage and one or more additional measured characteristics. The method also includes segmenting the wellbore into regions based on identified change of trend in one or more of the measurement logs of the set, and sub-segmenting at least one region into zones based on detection of appearance or disappearance of a rock type in the cuttings percentage log, The method also includes determining, in each zone, a location, length and rock type of one or more layers based on a total percentage of each rock type in the zone in the cuttings percentage log and at least one of the additional measurement logs.

A plurality of exemplary embodiments of such method are disclosed in the specification and claims.

The disclosure also relates to a second method for determining a lithology of a subterranean formation into which a wellbore has been drilled. The method comprises receiving a set of measurement logs comprising one or more measurement logs, each representing a measured characteristic of the wellbore plotted according to depth. The measured characteristics include at least cuttings percentage and one or more additional measured characteristics. The method also includes segmenting the wellbore into regions based on identified change of trend in at least one of the measurement log of the set and automatically generating a lithology log containing a sequence of layers, each identified by the location in depth, the length and the rock type in at least one region.

Automatically generating a lithology log may include sub-segmenting at least one region into zones based on detection of appearance or disappearance of a rock type in the cuttings percentage log and determining, in each zone, a location, length and rock type of one or more layers based on a total percentage of each rock type in the zone in the cuttings percentage log and at least one of the additional measurement logs. In such case, the plurality of exemplary embodiments described in relationship with the first method are also application to the second method.

The disclosure also relates to a system for determining a lithology of a subterranean formation into which a wellbore has been drilled. The system comprises a processing system having one or more processors configured to receive a set of measurement logs comprising one or more measurement logs. Each log represents a measured characteristic of the wellbore plotted according to depth, and the measured characteristics include at least cuttings percentage and one or more additional measured characteristics. The processing system is also configured to segment the wellbore into regions based on identified change of trend in at least one of the measurement log of the set and generate a lithology log containing a sequence of layers, each identified by the location in depth, the length and the rock type in at least one region.

The above-mentioned systems and methods enable to generate a consistent and accurate deliverable that is not influenced by operator bias or background and is available in real-time or near real-time at the well site for immediate decision making regarding the drilling operations.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, some features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.' In all the following, the terms of "upstream" and "downstream" are understood relatively to the normal direction of circulation of a fluid in a conduit.

Figure 1:
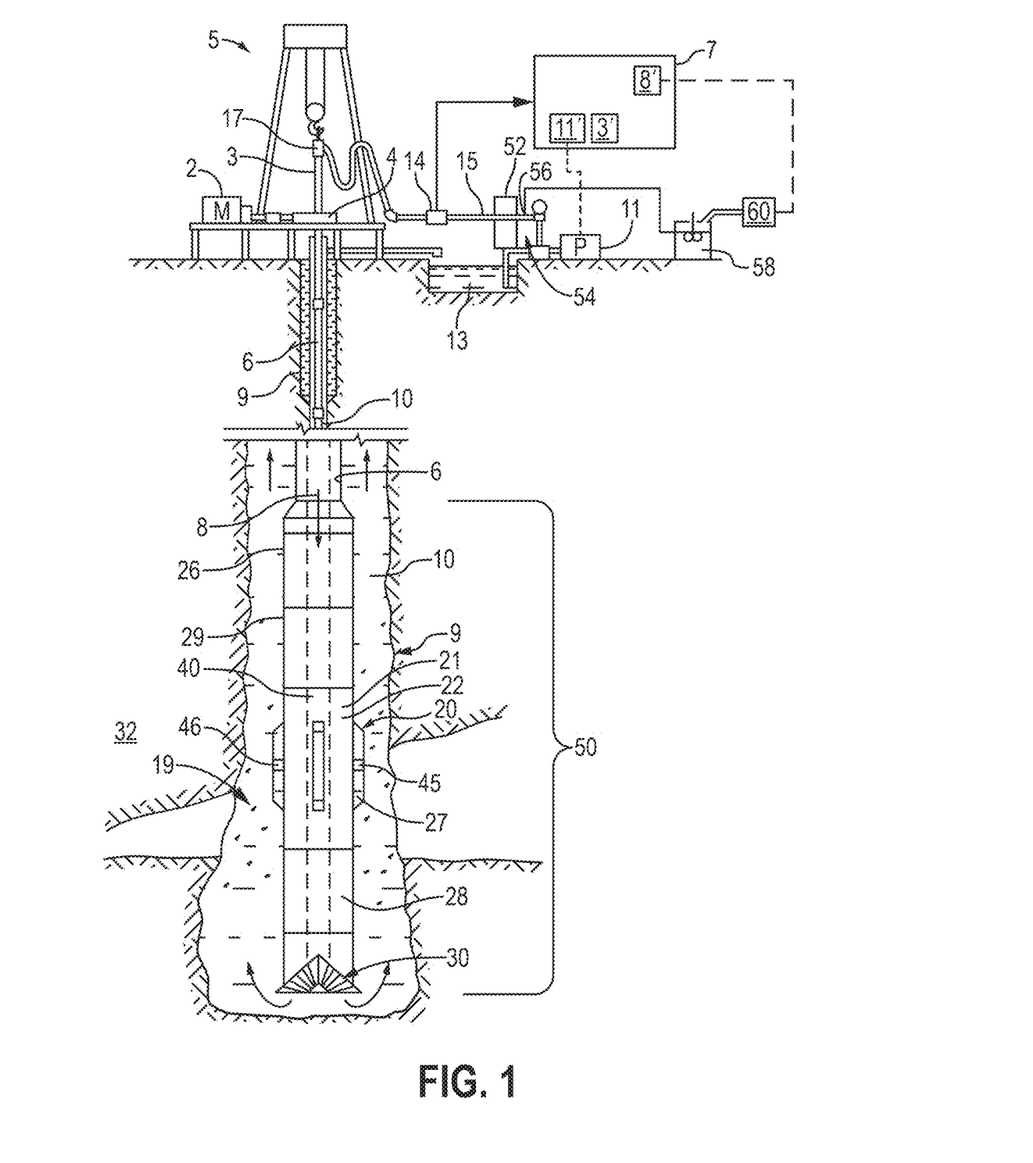
FIG. 1 is a schematic drawing of a well site installation including a system according to an embodiment of the disclosure.

FIG. 1 is a schematic drawing of an installation according to an embodiment of the disclosure.

FIG. 1 is a schematic view of at least a portion of an example implementation of a rotary drilling rig system 5. Downhole measurements can be conducted by instruments disposed in a drill collar 20. Such measurements may be stored in memory apparatus of the downhole instruments, or may be telemetered to the surface via conventional measuring-while-drilling (MWD) telemetering apparatus and techniques. For that purpose, an MWD tool sub, schematically illustrated as a tool 29, may receive signals from instruments of the collar 20, and may transmit them via a mud path 8 of a drill string 6 for receipt, e.g., ultimately via a pressure sensor 14 in a stand pipe 15 and/or to other surface instrumentation 7.

The drilling rig system 5 may include a motor 2 that may turn a kelly 3 through the use of a rotary table 4. The drill string 6 may include sections of drill pipe connected end-to-end to the kelly 3 and may be turned thereby. For example, a plurality of drill collars and/or tools 20, 26, 28, and 29 may be attached to the drilling string 6. Such collars and tools may collectively form a bottom hole assembly (BHA) 50 extending from the drill string 6 to a drilling bit 30.

As the drill string 6 and the BHA 50 turn, the drill bit 30 can bore a wellbore 9. An annulus 10 is thus defined between the outside of the drill string 6 (including the BHA 50) and the wellbore 9 through one or more subterranean geological formations 32.

A pump 11 may pump drilling fluid (drilling "mud") from a source, e.g., from a mud pit 13, via a stand pipe 15, a revolving injector head 17, and the mud path 8 of the kelly 3 and the drill string 6 to the drill bit 30. The mud may lubricate the drill bit 30 and may carry wellbore cuttings upward to the surface via the annulus 10. If desired, the mud may be returned, e.g., to the mud pit 13 or to an appropriate mud regeneration site, where it may be separated from cuttings and the like, degassed, and returned for application again to the drill string 6. Separating the cuttings from the mud is performed via shale shakers 52. Once the mud and the cuttings have been separated, they may be collected and analyzed. Cuttings samples 54 may be collected manually and analyzed in a mud logging cabin (not represented) with one or more instruments (such as microscope, X-ray fluorescence (XRF), X-Ray Diffraction (XRD), and the like). Alternatively, the cuttings sample may be collected and analyzed automatically at the well site. Regarding the mud (or drilling fluid), it is generally sampled at the outlet of the shakers by a sampling device 56 and directed to an extractor 58 that extracts gas from the mud. The gas is then directed to an analyzer 60 (such as Thermal Conductivity Detector (TCD), Flame Ionization Detector (FID) or mass spectrometer) in order to detect the content of one or more gas, optionally with the interposition of a gas chromatograph.

The downhole tool (collar) 20 may be any type of downhole tool taking measurement, such as an ultrasonic tool, an electromagnetic or resistivity tool, a sampling tool. For example, the ultrasonic tool 20 may include at least one or more sensors 45, 46, e.g., such as for measuring characteristics of the wellbore 9 and/or fluid, including pressure, standoff, composition, etc. therein during drilling operations. Such measurements may be conducted while the wellbore 9 is being drilled and/or with the drill string 6 and the BHA 50 in the wellbore 9 while the drill bit 30, the BHA 50, and the drill string 6 are not rotating. Such measurements may be conducted while the drill string 6, the BHA 50, and the drill bit 30 are being tripped to and from the bottom of the wellbore 9. The measurements (or data based at least partially thereon) may be transmitted to the surface via the MWD telemetry tool 29 and the internal mud passage 8 of the drill string 6 (or the annulus 10), or they may be recorded and stored downhole and for retrieval at the surface after the drill string 6 and BHA 50 have been removed from the wellbore 9.

The sensors 45, 46 may be mounted on stabilizer fins 27 of the downhole tool 20, as depicted in FIG. 1, or may be mounted in a cylindrical wall 23 of the downhole tool 20.

An electronics module 22 may contain electronic circuits, microprocessors, memories, and/or the like, operable to control, and/or to receive, process, and/or store data from the sensors 45, 46, which may be mounted on a sleeve, an inner tube, and/or other section 21 secured around or within the collar of the ultrasonic tool 20. The section 21 and other components of the BHA 50 may include a path 40 by which drilling mud may pass through the interior passage 8 of the drill string 6 to the drill bit 30.

A portion of the drilling rig system 5, such as surface instrumentation 7, may include other sensors for measurement parameters at the surface, such as flow, pressure, weight on bit, torque on bit, etc. and verify that the system works properly. As an example, a sensor 11' may be connected to the pump 11 to count the number of strokes of the pump, a sensor 3' may be present at the Kelly or motor to assess the rotations per minute (RPM) or in the weight and torque on bit.

The surface instrumentation 7 may also include data processing system 8 that can encompass one or more, or portions thereof, of the following: control devices and electronics in one or more modules of the BHA 50 (such as a downhole controller), a remote computer system (not shown), communication equipment, and other equipment. The data processing system may include one or more computer systems or devices and/or may be a distributed computer system. For example, collected data or information may be stored, distributed, communicated to a human wellsite operator, and/or processed locally or remotely.

The data processing system may, individually or in combination with other system components, is also linked to all or part of the sensors, downhole or at the surface, to process the measurements and may perform the methods and/or processes described below, or portions thereof. For example, such data processing system may include processor capability for collecting data obtained from the sensors at the surface or downhole. Methods and/or processes within the scope of the present disclosure may be implemented by one or more computer programs that run in a processor located, e.g., in one or more modules of the BHA 50 and/or surface equipment of the drilling rig system 5. Such programs may utilize data received from the BHA 50 via mud-pulse telemetry and/or other telemetry means, and/or may transmit control signals to operative elements of the BHA 50. The programs may be stored on a tangible, non-transitory, computer-usable storage medium associated with the one or more processors of the BHA 50 and/or surface equipment, such as surface instrumentation 7, of the drilling rig system 5, or may be stored on an external, tangible, non-transitory, computer-usable storage medium electronically coupled to such processor(s). The storage medium may be one or more known or future-developed storage media, such as a magnetic disk, an optically readable disk, flash memory, or a readable device of another kind, including a remote storage device coupled over a communication link, among other examples.

A method 100 for determining lithology of the formation is described in reference with FIGS. 2-8.

Figure 2:
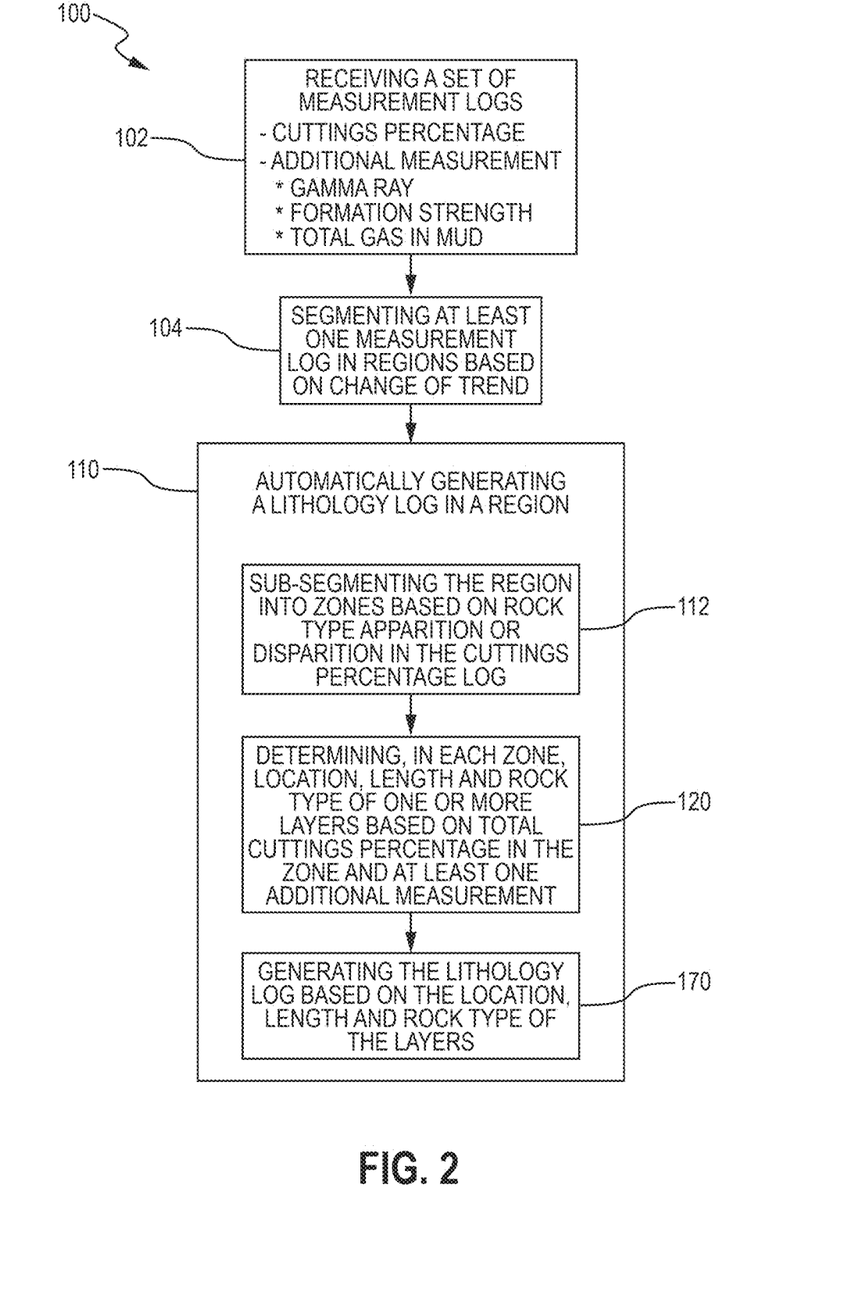
FIG. 2 is a flowchart of a method according to an embodiment of the disclosure.

The method first comprises receiving (block 102) a set of measurement logs comprising one or more measurement log. Each of the measurement log represents a measured characteristic of the wellbore plotted according to depth as can be seen on FIG. 3. The measurements log of the set comprise a cuttings percentage, obtained from the sampling of cuttings extracted from the wellbore at the surface, and one or more additional measurements, taken at the surface or downhole. Such additional measurement log may be directly sensed at the wellsite (for instance, weight on bit, torque on bit, total gas in mud obtained from the gas analyzer or gamma-ray count obtained from the downhole tool) or computed from a combination of sensed parameters (for instance, a formation strength). The method may therefore also comprise computing one of more of the measurements that are not directly obtained from sensed parameters. Concerning the formation strength, for instance, it may generally be computed from the weight on bit, rate of penetration and revolution per minutes of the drill bit.

Figure 3:
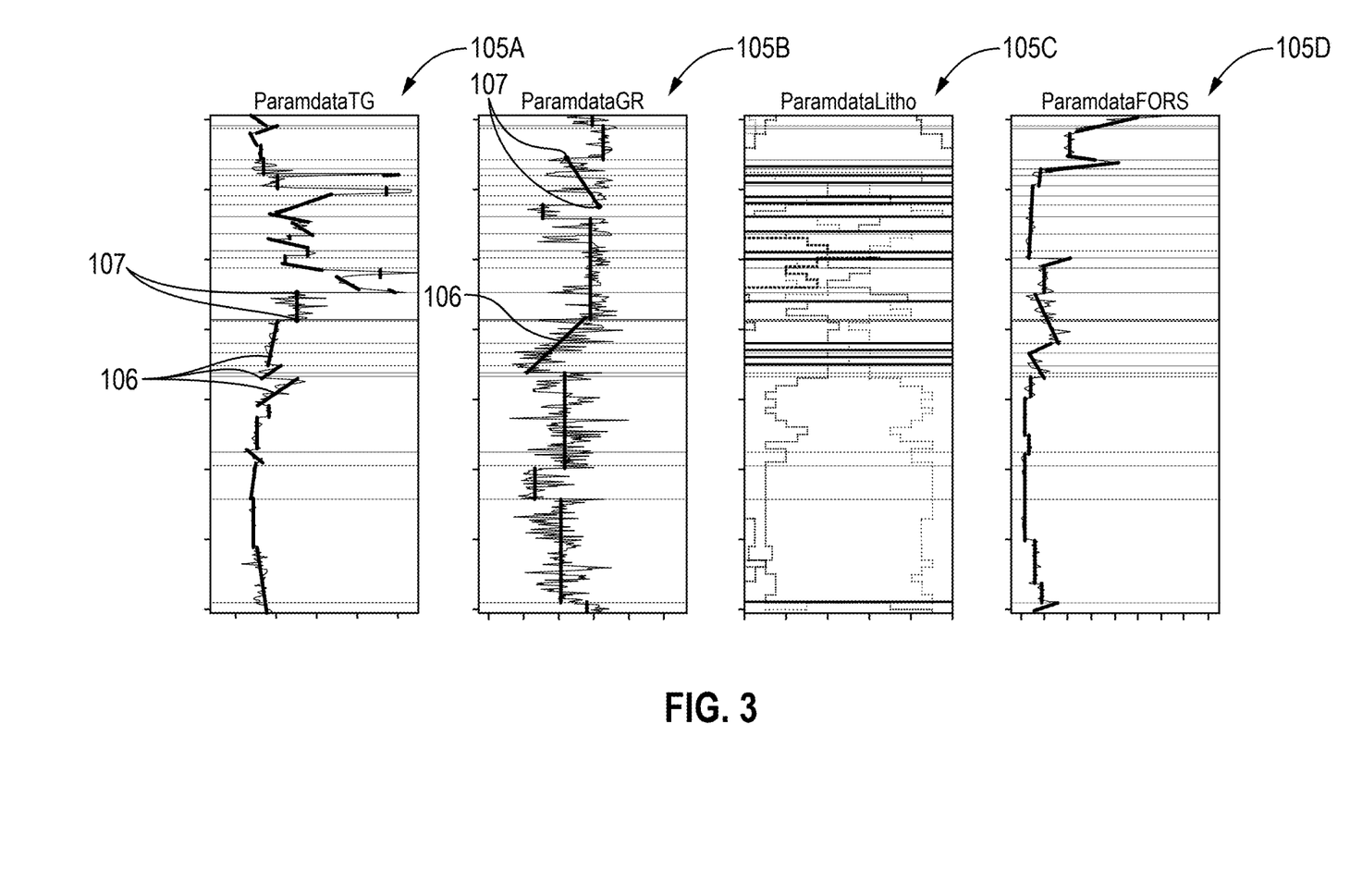
FIG. 3 shows measurement logs segmented at an operation of the method according to an embodiment of the disclosure.

One or more measurement logs of the set are then segmented (block 104) based on change of trend in the log. We can see examples of measured characteristics being total gas in mud 105A, gamma-ray count 105B, cuttings percentage 105C and formation strength 105D. In each log, there are many variations of the measurement from which the general trends 106 are extracted. The points 107 situated at the change or inflexion of a trend is considered as a "change point" and its depth is considered as an extremity of a region. Therefore, the measurement log is segmented into regions based on the trend analysis.

The trend analysis and "change point" determination may be obtained by using a "Change Point' algorithm. This algorithm allows a detection of the edges. It is based on a Bayesian approach but the kind of approach is not limited other approaches for segmenting the log may be used. The "Change Point" algorithm is disclosed in more details in patent application WO2010/043951.

The trend analysis may be run on one log, such as rate of penetration, total drilled gas, gamma ray from MWD, and any LWD measurements such as resistivity when available.

For more robustness, the trend analysis may also be performed on a plurality of measurement logs 105A-105D as represented on FIG. 3. In this case, all "change points" may not be selected and some conditions may apply, such as selecting a first "change point" depth in a first log as an extremity of a region if at least another log show a "change point' in a predetermined depth interval around the first "change point' depth. In this case, the other "change point" in the depth interval may be deleted. Alternatively, a measurement log may be associated to a confidence in view of the type of measurement and of the way the measurement was performed and the measurement with highest confidence may be chosen as reference measurement and its 'change point' may be used for determining the regions.

The method then comprises generating an interpreted lithology log (block 110) in at least one region of the wellbore. Therefore, the interpreted lithology may be obtained in a consistent way, in real-time. In particular, the method may be configured to automatically generate the interpreted lithology log. By "automatically", it is meant that the operations performed as part of block 110 are performed without direct human control. A human may set parameters or validate the results of the automatic generation but does not need to intervene so that the operations described herebelow are performed.

Figure 4:
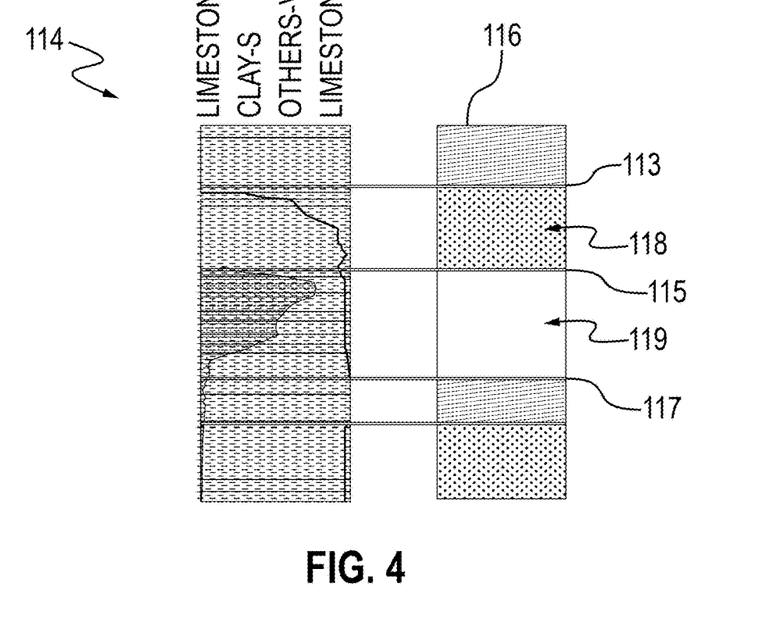
FIG. 4 is a plot showing a sub-segmentation of a region of the wellbore based on a cuttings percentage log as per the method according to an embodiment of the disclosure.

The generation comprises subsegmenting (block 112) the region into zones based on rock type appearance and disappearance in the cuttings percentage log as represented on FIG. 4, showing a region of the cuttings percentage log 114. The boundary of the zone corresponds to the depth of the rock type appearance or disappearance. In other words a zone ends and a new zone starts when a new type of cuttings appears on the cuttings percentage log or disappears from the cuttings percentage log. For instance, as can be seen on FIG. 4, there is only a first rock type (here, clay-s) in a upper portion of the log 114. This portion forms a first zone 116 that ends at depth 113 when a second type of rock type (here limestone) appears in the cuttings percentage log. The second zone 118 starts at 113 and ends at depth 115 when a third rock type (such as dolomite) appears, starting a third zone 119. The third zone 118 ends at 117 when the third rock type disappears from the log.

Then, in each zone, the method includes determining (block 120) the location, length and rock type of one or more layers based on total rock type percentage in the zone and at least one additional measured characteristic (i.e. measurement). This operation is represented in more details in FIG. 5.

Figure 5:
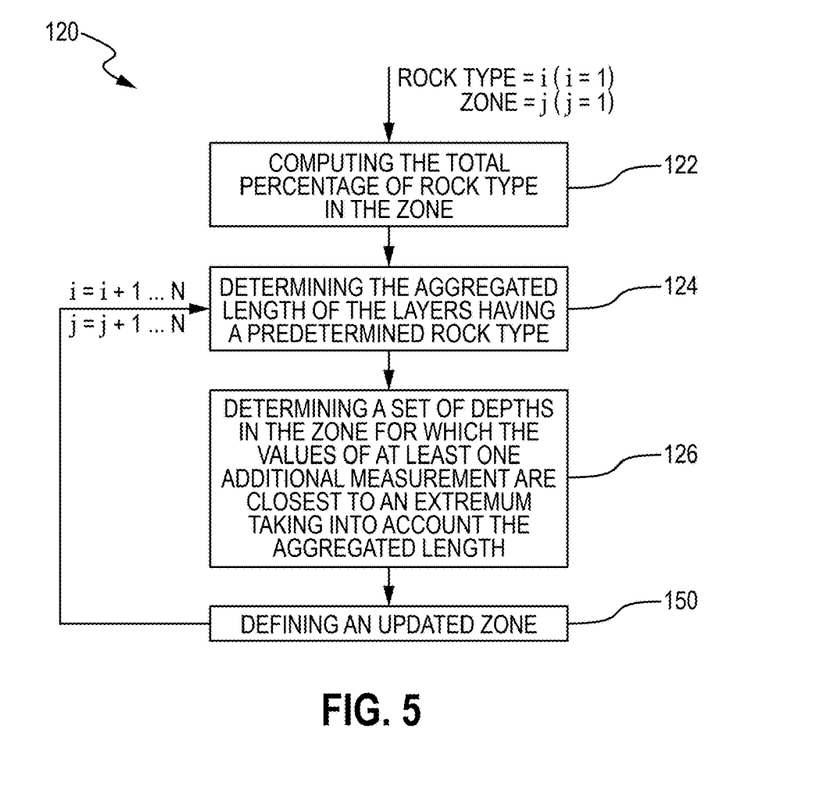
FIG. 5 is a flowchart of an operation of the method according to an embodiment of the disclosure.

First, the operation 120 comprises computing (block 122) the total percentage of each rock type in a zone. This may be performed for instance by computing the area between two curves on the measurement log, that is representative of the measurement. For instance, in zone 114, the percentage of the first rock type would be 100% while the percentage of second and third rock type would be 0%. In zone 116, the total percentage of second rock type would be defined by the area 122 and the total percentage of first rock type by the area 124, both divided by the total area of the zone.

The method then comprises determining (block 124) the aggregated length of the layers having a predetermined rock type. In the following the "length" of a layer is defined as the difference between the depths it extends. For instance the length of the zone 118 is the difference between depth 113 and depth 115. The "aggregated length" of the layers is the sum of their respective length. Determining the aggregated length of the layers includes determining a length corresponding to a percentage of the zone length equal to the total percentage of the predetermined rock type in the zone, ie multiplying the length of the zone by the total percentage for the rock type. The aggregated length is used to preserve the distribution of cuttings percentage. For example, if a zone has a length of 50 m, and there 20% of clay in the zone, the aggregated length of the clay layers, whether in one or several layers, is 10 m.

The method also comprises determining (block 126) a location of one or more layers having the predetermined rock type. This includes determining a set of depths in the zone for which the values of one of the additional measurement are closest to an extremum of the measurement in the zone. The set of depths is determined so that its aggregated length matches the aggregated length of the layers. The additional measurement may be any additional measurement that is considered relevant. For instance, for clay or shale, the selected additional measured characteristic may be gamma-ray count, for limestone, the selected additional measured characteristic may be formation strength and for sandstone, the selected additional measured characteristic may be total gas in mud. For these three additional measured characteristics, the location of the layers is detected based on a set of depths closest to a maximum of the log. The disclosure is however not limited to this set of additional measured characteristics and any other relevant additional measured characteristic may be selected. Further, the minimum of the corresponding log of such characteristic may also be selected for attributing the location of the layers.

Figure 6:
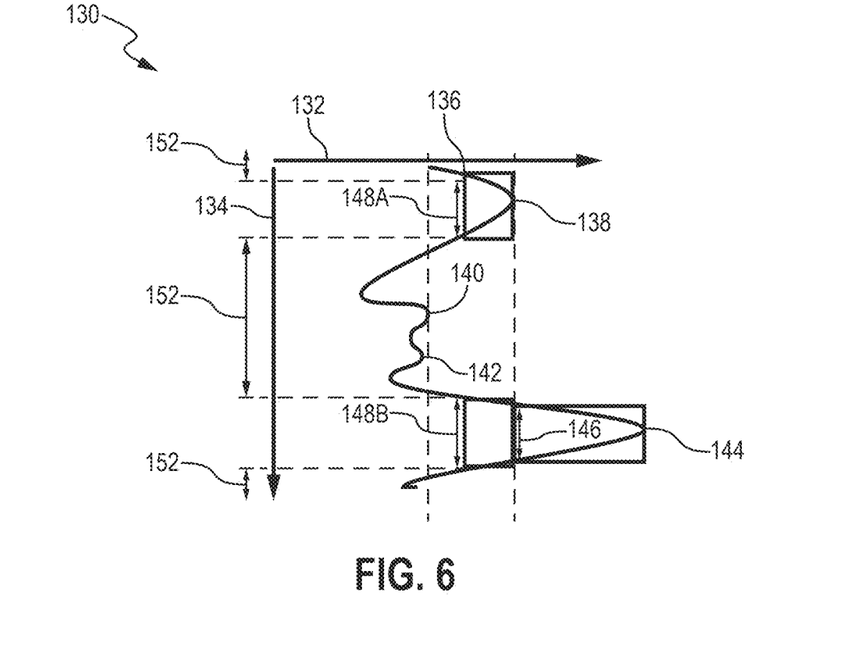
FIG. 6 is a plot showing a measurement log and a representation of an operation according to an embodiment of the disclosure.

FIG. 6 shows this operation in more detail. FIG. 6 shows a measurement log 130 having an additional measured characteristic 132 as a function of depth 134 and enables to identify a first predetermined rock type. For instance, as represented on FIG. 6, this operation includes identifying a key value 136 for which the depth intervals (ie set of depths) of data points having values superior to the key value corresponds to the aggregated length of the layers. This may be performed by flagging local maxima 138-144 and calculating the depth interval of the data points having values superior to all local maxima except for one (see interval 146 on FIG. 6). It corresponds to a location of a first layer. This depth interval may be compared with the aggregated length of the layers of the predetermined rock type computed. If the interval is shorter than the aggregated length that has been computed, the location of a second layer will be set around the second highest maximum 138 and the sum of the depth intervals having data points having values superior to all local maxima except for two may be calculated (intervals 148A, 148B). If the interval is shorter than the aggregated length of the layers of the predetermined rock type that has been computed, the operation is renewed with the third local maxima. If the sum of depth intervals is longer than the aggregated length, the key value 136 may be search between the second and third highest maxima 138 and 140, for instance using squeezing techniques. The set of depths is defined as all depths having values being superior to the key value, in particular on FIG. 6, intervals 148A, 148B.

Preferably, as several rock type are present in the formation, once the locations of the layers of the predetermined rock type, designated first predetermined rock type, have been determined, the location of the layers of another rock type, i.e., second rock type, are determined.

Therefore, the method includes defining (block 150) an updated zone so that the updated zone comprises the length of the initial zone except for the set of depths that has been selected as the location of the first rock type. The updated zone is shown on FIG. 6 as 152.

The method is then reset with a second predetermined rock type and the updated zone, ie the aggregated length of the layers having second rock type is determined, and a second set of depths corresponding to the location of these layers is determined. The second set of depths may be determined based on the same additional measurement that has been used for the first predetermined rock type, or based on a different additional measurement.

Figure 7:
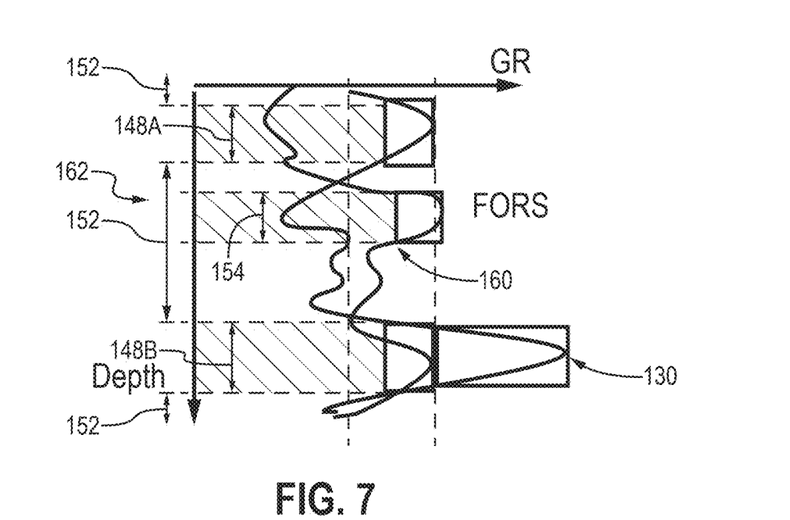
FIG. 7 is a plot showing two measurement logs and a representation of an operation according to an embodiment of the disclosure.

As can be seen on FIG. 7, showing two additional measurements 130, 160 plotted on the same chart as a function of depth 162, the first additional measurement already represented on FIG. 6 that enabled to determine the locations of layers of the first predetermined rock type and a second additional measurement enabling to determine the second rock type, the same operation of determining the location of the layers by determining the set of depths closest to an extremum is performed again but in the updated zone 152, discarding the data points that are in the depth intervals 148A, 148B. In this scenario, there is only one layer of the second predetermined rock type at the depth interval 154.

These operations 124, 126, 150 may be performed iteratively until no measurement is available to identify a particular rock type. It can be adaptative depending on the number and type of measurement available in the well and some parameters relative to the well, for instance its geometry or the region in which it is disposed. When no measurement is available anymore, an operator may be consulted to complete the interpreted lithology log, or the location of the remaining layers may be determined based on the remaining locations.

A sequence that could be used for determining the locations of layers may be the following:
- The first predetermined rock type is clay and shale and the locations of the layers having this rock type is determined based on gamma-ray measurement maxima,
- The second predetermined rock type is limestone and the locations of the layers having this rock type is determined based on formation strength measurement maxima,
- The third predetermined rock type is sandstone and the locations of the layers having this rock type is determined based on total gas in mud measurement maxima.

As previously indicated, this sequence is an exemplary one and other sequences may be used within the scope of the disclosure.

The method then comprises generating (block 170) the interpreted lithology log based on the location, length and rock type of the layers, corresponding to plot the location of the layers as a function of depth. Such a log 180 is represented on FIG. 8

Figure 8:
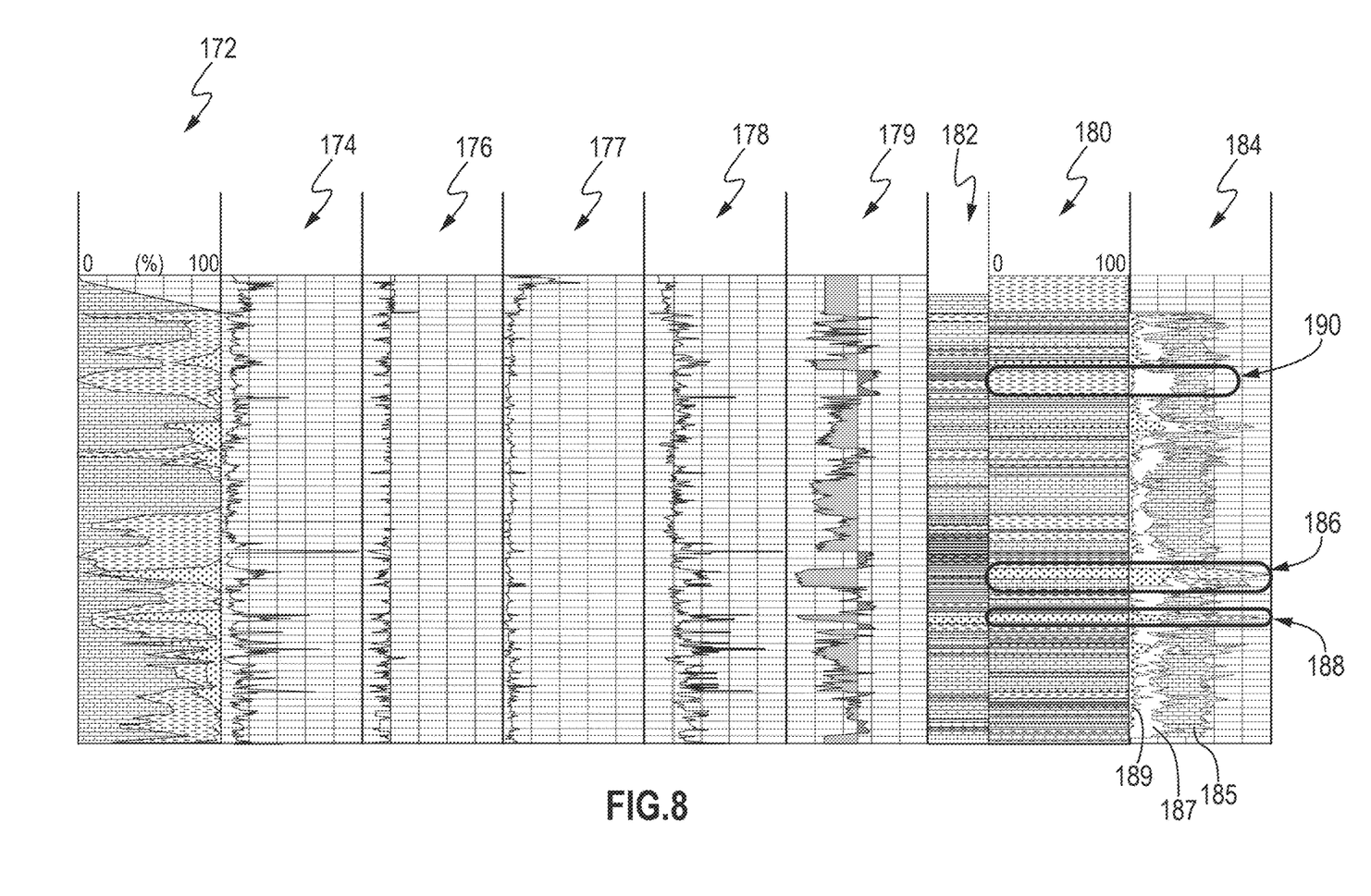
FIG. 8 shows a representation of an interpreted lithology log obtained by the method according to the disclosure and a compared to an interpreted lithology obtained by an operator based on the same measurement logs

The method as per the disclosure has been tested with the above-mentioned on a well site. The figure shows cuttings percentage 172, Formation strength 174, rate of penetration (ROP) 176, total gas (TG) 177, mechanical specific energy (MSE) 178, gamma-ray (GR) 179, all parameters that may be used in the determination of the interpretation lithology log. The figure shows as well an interpreted lithology log 180 obtained by the above-mentioned method and compared with the interpreted lithology as established by the operator on site 182 as well as mineralogy obtained by downhole tool 184. The mineralogy shows (quartz, feldspath, mica) at 185, the carbonate at 189 and clay at 187. The results 180 obtained by the method are more coherent and compact than the results from the operators 182, as can be seen from comparison with LWD mineralogy. For instance, in zone 186, a dolomite zone is visible in the log 180 and this zone is perfectly aligned with the carbonate zone in the log 184. Similarly in zone 188, the log 180 shows a zone of dolomite that is in agreement with what is shown on log 184. In zone 190, the LWD log 184 shows a zone of clay that matches with the clay zone that is obtained with the above-mentioned method.

We can see that both interpreted lithology logs are very similar. The method according to the disclosure enabling to obtain the interpreted lithology early on, in real-time or near real-time, enables to have more information regarding the formation and to take more educated drilling decisions as soon as possible.

The disclosure relates to a first method for determining a lithology of a subterranean formation into which a wellbore has been drilled. The method comprises receiving a set of measurement logs comprising one or more measurement logs, each representing a measured characteristic of the wellbore plotted according to depth. The measured characteristic includes at least cuttings percentage and one or more additional measured characteristics. The method also includes segmenting the wellbore into regions based on identified change of trend in one or more of the measurement logs of the set, and sub-segmenting at least one region into zones based on detection of appearance or disappearance of a rock type in the cuttings percentage log, The method also includes determining, in each zone, a location, length and rock type of one or more layers based on a total percentage of each rock type in the zone in the cuttings percentage log and at least one of the additional measurement logs.

A plurality of exemplary embodiments of such method are disclosed in the specification and claims.

In an embodiment, the additional measured characteristics comprise one or more of a gamma-ray count, a rate of penetration, a total gas in mud, a formation strength, a weight on bit, or a resistivity. In particular, when the additional measured characteristics comprise the formation strength, the method comprises computing the formation strength from the weight on bit, revolutions per minute and rate of penetration.

In an embodiment, determining the length of one or more layers having a predetermined rock type in the zone includes determining an aggregated length of layers having the predetermined rock type, wherein the aggregated length corresponds to percentage of the zone length equal to the total percentage of the predetermined rock type in the zone. In particular, determining a location of one or more layers having the predetermined rock type include determining a set of depths in the zone, the set of depths being defined so that the corresponding values for at least one of the additional measured characteristics are closest to an extremum of the additional measured characteristic in the zone, wherein the set of depths is determined so that its aggregated length matches the aggregated length of the layers having the predetermined rock type In the above-mentioned embodiment, the method may include determining the aggregated length of layers for each rock type, determining the location of the one or more layers having a first predetermined rock type in the zone, creating an updated zone consisting of the zone excluding the set of depths corresponding to the first predetermined rock type and determining the location of the one or more layers having a second predetermined rock type in the updated zone. In particular, determining the location of the one or more layers having the first predetermined rock type in the zone may be based on a first additional measured characteristic and determining the location of the one or more layers having the second predetermined rock type in the updated zone is based on a second additional measured characteristic.

In a particular embodiment, determining the location of one or more layers having the predetermined rock type may include selecting the set of depths according to one or more of the following:

The additional measured characteristics including gamma-ray count, the set of depths having gamma-ray count values closest to a maximum is selected when the predetermined rock type is clay and shale, The additional measured characteristics including a formation strength, the set of depths having formation strength values closest to a maximum is selected when the predetermined rock type is limestone, The additional measured characteristics including a formation total gas in mud, the set of depths having total gas in mud values closest to a maximum when the predetermined rock type is sandstone.

In an embodiment, if a first predetermined rock type is clay and shale, the method may determine a first set of depths in the zone having gamma-ray count values closest to a maximum. If a second predetermined rock type is limestone, the method may determine a second set of depths having formation strength values closest to a maximum in a first updated zone consisting of the zone excluding the first set of depths. If a third predetermined rock type is sandstone, the method may determine a third set of depths in a second updated zone consisting of the first updated zone excluding the second set of depths.

In an embodiment, segmenting the measurements log includes identifying change points in the measurement log, wherein at least a change point depth is defined as a boundary of a region. In such case, segmenting the measurements may include identifying first change points in a first measurement log and second change points in a second measurement log and selecting a depth of a first change point as a boundary of a region if a second change point is identified in a predetermined depth interval around said depth.

In an embodiment, the method includes generating a lithology log based on the location, length and rock type of the one or more layers.

The disclosure also relates to a second method for determining a lithology of a subterranean formation into which a wellbore has been drilled. The method comprises receiving a set of measurement logs comprising one or more measurement logs, each representing a measured characteristic of the wellbore plotted according to depth. The measured characteristics include at least cuttings percentage and one or more additional measured characteristics. The method also includes segmenting the wellbore into regions based on identified change of trend in at least one of the measurement log of the set and generating a lithology log containing a sequence of layers, each identified by the location in depth, the length and the rock type in at least one region. The generation of the lithology log is preferably made automatically, ie without direct human control.

Generating a lithology log may include sub-segmenting at least one region into zones based on detection of appearance or disappearance of a rock type in the cuttings percentage log and determining, in each zone, a location, length and rock type of one or more layers based on a total percentage of each rock type in the zone in the cuttings percentage log and at least one of the additional measurement logs. In such case, the plurality of exemplary embodiments described in relationship with the first method are also application to the second method.

The disclosure also relates to a system for determining a lithology of a subterranean formation into which a wellbore has been drilled. The system comprises a processing system having one or more processors configured to receive a set of measurement logs comprising one or more measurement logs. Each log represents a measured characteristic of the wellbore plotted according to depth, and the measured characteristics include at least cuttings percentage and one or more additional measured characteristics. The processing system is also configured to segment the wellbore into regions based on identified change of trend in at least one of the measurement log of the set and generate a lithology log containing a sequence of layers, each identified by the location in depth, the length and the rock type in at least one region. The processing system may be configured to generate automatically the lithology log, ie without direct human control.

The system may comprise at least one of a cuttings sample analysis device for analyzing cuttings exiting the wellbore and at least one of a gas sample analysis device for analyzing gas extracted from the drilling fluid exiting the wellbore, wherein one of the additional measured characteristic is total gas in mud; a downhole tool for taking one or more downhole measurement, wherein one of the additional measured characteristic is gamma-ray count or resistivity; and a sensor situated at the well site, at the surface, to measure one or more of the parameters relative to a drilling installation of the wellbore, wherein one of the additional measured characteristic is weight on bit, torque on bit, rate of penetration, rotation per minute or formation strength.

Further, the processing system may be configured to sub-segment at least one region into zones based on detection of appearance or disappearance of a rock type in the cuttings percentage log, and, in each zone, determine a location, length and rock type of one or more layers based on a total percentage of each rock type in the zone in the cuttings percentage log and at least one of the additional measurement logs.

The invention claimed is:

1. A method, comprising:
drilling a wellbore via drilling operations of a drilling rig system;
sampling cuttings from the drilling operations via a sampler;
measuring with one or more sensors during the drilling operation measurements of a characteristic comprising gamma ray count, formation strength, and total gas in mud, wherein the measurements are based on cuttings obtained by the sampler;
identifying a first set of change points in a first measurement log of the measurements of cutting percentage as a function of a depth of the wellbore based on the cuttings obtained by the sampler during the drilling operations of the drilling rig system, wherein each change point of the first set of change points corresponds to a respective identified trend change in the measurements of the cutting percentage along the depth of the wellbore;
identifying a second set of change points in a second measurement log of the measurements of the characteristic as a function of the depth of the wellbore based on input obtained by the one or more sensors during the drilling operations of the drilling rig system, wherein each change point of the second set of change points corresponds to a respective identified trend change in the measurements of the characteristic along the depth of the wellbore;
segmenting the wellbore into a plurality of regions based on the first set of change points and the second set of change points;
sub-segmenting a first region of the plurality of regions into a plurality of zones based on one or more rock types being detected in the first measurement log;
determining respective locations, lengths, and rock types of one or more layers in a first zone of the plurality of zones based on a total percentage of each of the one or more rock types in the first zone during the drilling operations; and
automatically generating a representation showing an interpreted lithology log in real time during the drilling operations for decision-making regarding the drilling operations, wherein the representation of the interpreted lithology log shows a sequence of the one or more layers as the function of the depth based on the determined respective locations, lengths, and rock types of the one or more layers in the first zone of the plurality of zones, and the first zone visible in the representation of the interpreted lithology log is aligned with a zone in a representation of mineralogy.

2. The method of claim 1, further comprising:
identifying a third set of change points in a third measurement log of measurements of an additional characteristic along the depth of the wellbore, wherein each change point of the third set of change points corresponds to a respective identified trend change in the measurements of the additional characteristic along the depth of the wellbore; and
wherein the segmenting the wellbore into the plurality of regions is further based on the third set of change points.

3. The method of claim 1, wherein segmenting the wellbore into the plurality of regions based on the first set of change points and the second set of change points comprises:
identifying that a depth of a first change point of the first set of change points is within a depth interval of a depth of a second change point of the second set of change points; and
selecting the depth of the first change point of the first set of change points as a boundary of a first region of the plurality of regions.

4. The method of claim 1, wherein determining the respective lengths of the one or more layers in the first zone comprises determining an aggregated length of the one or more layers having a particular rock type of the one or more rock types, wherein the aggregated length corresponds to a percentage of the particular rock type in the first zone.

5. The method of claim 4, wherein determining the respective locations of the one or more layers in the first zone comprises determining a set of depths in the first zone, wherein the measurements of the characteristic at the set of depths correspond to an extremum of the measurements of the characteristic in the first zone, wherein an aggregated length of the set of depths correspond to the aggregated length of the one or more layers having the particular rock type.

6. The method of claim 5, wherein the determining of the set of depths is based on:
   the measurements of the characteristic comprising the gamma-ray count, wherein the set of depths having gamma-ray count values closest to a maximum gamma-ray count value is selected when the particular rock type is clay and shale;
   the measurements of the characteristic comprising the formation strength, wherein the set of depths having formation strength values closest to a maximum formation strength value is selected when the particular rock type is limestone; and
   the measurements of the characteristic comprising the total gas in mud, wherein the set of depths having total gas in mud values closest to a maximum total gas in mud value when the particular rock type is sandstone.

7. The method of claim 4, wherein the particular rock type is a first predetermined rock type, and wherein determining the length of the one or more layers further comprises:
   creating an updated zone comprising the first zone, excluding a set of depths corresponding to the first predetermined rock type; and
   determining the respective locations of the one or more layers having a second predetermined rock type in the updated zone.

8. A system, comprising:
   one or more sensors;
   one or more processors, and
   a memory, accessible by the processor, the memory storing instructions that, when executed by the processor, cause the processor to perform operations comprising:
     drilling a wellbore via drilling operations of a drilling rig system;
     sampling cuttings from the drilling operations via a sampler;
     measuring with the one or more sensors during the drilling operation measurements of a characteristic comprising gamma ray count, formation strength, and total gas in mud, wherein the measurements are based on cuttings obtained by the sampler;
     identifying a first set of change points in a first measurement log of the measurements of cutting percentage as a function of a depth of the wellbore based on the cuttings obtained by the sampler during the drilling operations of the drilling rig system, wherein each change point of the first set of change points corresponds to a respective identified trend change in the measurements of the cutting percentage along the depth of the wellbore;
     identifying a second set of change points in a second measurement log of the measurements of a characteristic as a function of the depth of the wellbore based on input by the one or more sensors during the drilling operations of the drilling rig system, wherein each change point of the second set of change points corresponds to a respective identified trend change in the measurements of the characteristic along the depth of the wellbore;
     segmenting the wellbore into a plurality of regions based on the first set of change points and the second set of change points;
     sub-segmenting a first region of the plurality of regions into a plurality of zones based on one or more rock types being detected in the first measurement log;
     determining one or more attributes of one or more layers in a first zone of the plurality of zones based on a total percentage of each of the one or more rock types in the first zone during the drilling operations; and
     automatically generating a representation showing an interpreted lithology log in real time during the drilling operations for decision-making regarding the drilling operations, wherein the representation of the interpreted lithology log shows a sequence of the one or more layers as the function of the depth based on the determined respective locations, lengths, and rock types of the one or more layers in the first zone of the plurality of zones, and the first zone visible in the representation of the interpreted lithology log is aligned with a zone in a representation of mineralogy.

9. The system of claim 8, wherein the operations further comprise:
   identifying a third set of change points in a third measurement log of measurements of an additional characteristic along the depth of the wellbore, wherein each change point of the third set of change points corresponds to a respective identified trend change in the measurements of the additional characteristic along the depth of the wellbore;
   wherein the segmenting the wellbore into the plurality of regions is further based on the third set of change points.

10. The system of claim 8, wherein the one or more attributes comprise respective locations, lengths, and rock types, or any combination thereof, of the one or more layers in the first zone of the plurality of zones.

11. The system of claim 8, wherein the characteristic also comprises a rate of penetration, a weight on bit, a resistivity, or any combination thereof.

12. The system of claim 8, wherein the one or more rock types comprise sandstone, clay, shale, and limestone, or any combination thereof.

* * * * *